Nov. 23, 1926.  
A. HERRMANN  
1,607,827  
VALVE  
Filed April 14, 1924
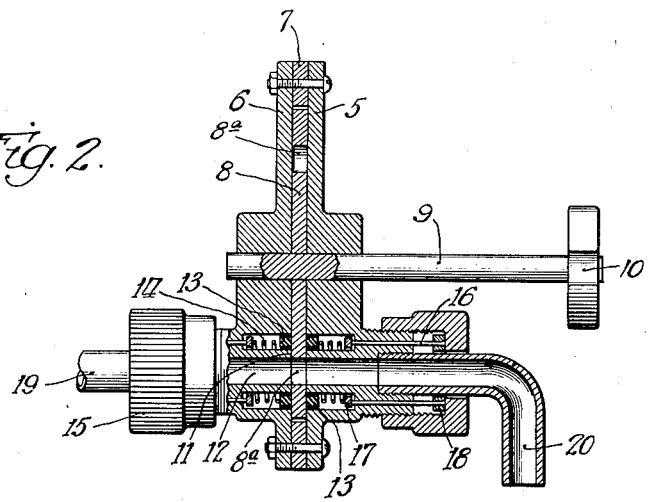
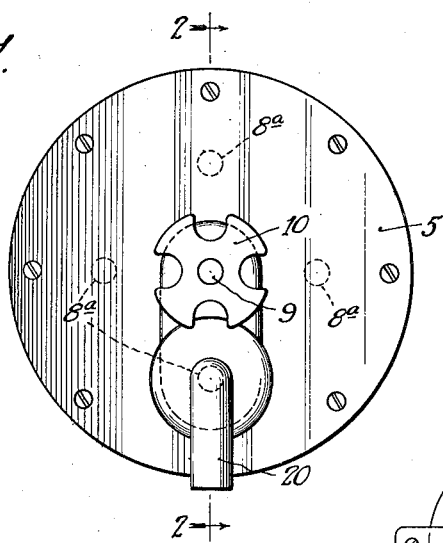
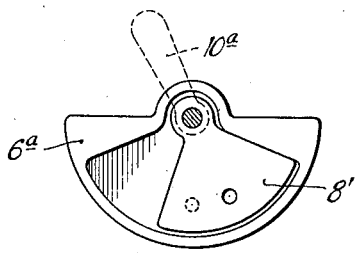
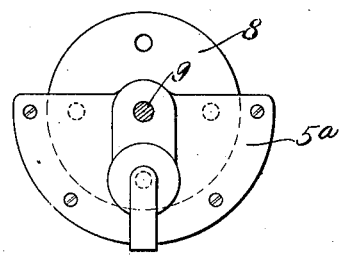
Inventor.  
Adolph Herrmann.  
By George E. Mueller  
Atty.

Patented Nov. 23, 1926.

1,607,827

UNITED STATES PATENT OFFICE.

ADOLPH HERRMANN, OF CHICAGO, ILLINOIS.

VALVE.

Application filed April 14, 1924. Serial No. 706,409.

My invention relates to valves of the disk type and has to do more particularly with double face disk valves, an object being to provide an improved structure of this character having certain features in construction and operation more particularly hereinafter pointed out in the specification and appended claims.

An object of my invention is to provide a valve adapted for use on coffee urns, although of course not limited to such particular use. I find that in the valves or faucets now in general use on coffee urns of the type employed in restaurants, after using them for a short time they leak. In my improved valve I overcome this defect by the use of a packing which surrounds the valve seats, so as to stop the slight leakage which usually occurs. In the use of a packing on valves for coffee urns, with the packing exposed to direct contact with the coffee while the valve is shut off, the coffee in contact with the packing frequently becomes bitter and thus renders the first part of the coffee drawn from the valve after it is opened unfit for use. Or if it is used it taints the rest of the coffee as it is allowed to run into the cup.

I overcome this objection by providing a metallic seat which, if it does permit leakage, the coffee seeping through is stopped by the packing. But such leakage or contact of the coffee with the packing is so slight that it does not have any bad effect.

Although I have described my improved valve as used with a coffee urn, it is to be understood that this is merely for illustration and it will be apparent that the same principle and protection will apply when using it with other fluids.

For a better understanding of my invention reference is to be had to the accompanying drawing, in which—

Fig. 1 is a face view of the preferred form of my valve;

Fig. 2 is a sectional view along the line 2—2 of Fig. 1; and

Fig. 3 shows a modified form of valve.

Fig. 4 shows a modified form of valve.

Referring now more in detail to the form shown in Figs. 1 and 2, I provide a suitable casing including a front section 5 and rear section 6 secured to a suitable separating ring 7, so as to provide a valve disk chamber between the opposing faces of the front and rear sections. In this chamber is a suitable disk and in this form of my invention it comprises a double face annular disk 8 adapted to rotate in the valve chamber and in sliding contact with the engaged faces. The disk 8 has a suitable valve stem 9 connected therewith, having a handle 10. In this form of my invention the disk has a plurality of ports $8^a$ extending therethrough, there being four as indicated by the dotted line in Fig. 1. This disk, of course, is enclosed in the casing and in order to guide the user so that it may be determined when the ports $8^a$ register with the valve casing ducts, I employ an indicating handle 10 cut away at four positions corresponding with the ports $8^a$, as will be clear from Fig. 1.

In the valve seat construction employed, that is the valve seat in the casing against which the disk rests, the same arrangement is used in both front and rear sections of the casing to engage opposite faces of the disk and I will describe but one of them. This seat construction includes an annular section 11 having a port or duct 12 extending therethrough, the valve seat of the annular ring 11 being ground so as to be in intimate contact with the corresponding face of the disk.

The difficulty found in depending upon such metallic faces alone is that after slight wear the liquid leaks by and drips from the faucet. To overcome this I provide an annular packing 13 which surrounds the annular face 11, being preferably pressed into intimate contact with the face of the disk by a spring 14. I find it desirable to have adjustment for this spring and have found that this is preferably done by adjustment from the outside. To this end I provide a nut 15 threaded on a hub surrounding the casing duct and connected with the spring 14 by small metal rods 16 fastened to a spring actuated ring 17 at one end and a ring 18 at the other end. Thus, as the nut 15 is adjusted on the hub the tension of the spring 14 is varied accordingly.

The packing 13 may be of any suitable material, and although I have shown a soft packing it is to be understood that a metallic packing may be employed.

It will also be apparent that the valve disk is balanced in the casing by the use of opposed spring pressed packings, the pressure being from opposite sides and therefore equalizing the action upon the valve disk and permitting an easier operation thereof.

It will also be apparent that a simplified construction of the valve is provided by the use of front and back sections of the casing identical in arrangement.

In applying the valve it may be connected with inlets and an outlet spout, the inlet pipe being shown at 19 and the outlet at 20. These latter two members being threaded into the hubs as indicated, or they may be secured in any suitable manner.

In the operation of the valve the handle 10 is normally in a position so that the port openings 8ª in the valve disk set to one side of the duct leading through the casing, thereby maintaining the valve closed. Not only is the valve closed by reason of engagement between the annular valve seat 11 and the valve face on the disk, but the packing 13 also is pressed against the disk face to prevent leakage. To open the valve the operator grasps the handle 10, and by means of the cut away portions thereof knows when the ports are in full or partial registration, or closed. In the form shown in Figs. 1 and 2 the disk may be rotated and any of its ports used, this arrangement thus providing a valve of longer life.

In Fig. 3 I have shown a modified form of the valve, wherein I employ a disk or gate section 8' in the form of a sector adapted to be reciprocated back and forth by a handle 10ª to open and close the valve. The gate 8' fits with a corresponding recess or chamber in the casing sections as 6ª, the front and back portions of which are of like construction as in Figs. 1 and 2, but of course of the shape indicated rather than of the circular disk type.

In Fig. 4 I show a circular disk valve similar to that of Figs. 1 and 2 except that the casing 5ª is cut off so as to expose the disk 8. This permits wiping off the disk so as to keep it bright and clean and insure a better joint.

What I claim as new and desire to secure by United States Letters Patent is:

1. A valve comprising a ported rotatably slidable gate, a casing having an annular recess cut into its face forming a flat annular ported valve seat against which the gate slides, an annular packing within the recess and surrounding the annular seat adjustably spring pressed against the gate face in sliding engagement therewith by means of a spring inside the portion of the casing, a nut threaded over the outside of the casing surrounding the valve seat port, and connections extending from the nut through the casing to the spring for adjusting the spring from outside the valve by operation of the nut.

2. A double face disk valve including a ported rotatable circular disk having two opposed valve faces and a casing having corresponding annular ported valve seats between which the disk is rotated, said casing enclosing a portion of the disk only whereby as the disk is rotated successive portions are exposed for cleaning, and opposed spring pressed packings surrounding the valve seats acting upon the disk and equalizing the pressure on opposed sides of the valve disk.

3. A valve of the character described comprising a casing including front and back like disc-like portions each having a boss on its outer face, a flat separating ring clamped between the front and back portions to provide a chamber therebetween with opposing walls having an inlet port through the rear wall boss and an outlet port through the front wall boss extending through parallel faced valve seats, a rotatable double faced disk mounted in the chamber in sliding seating engagement with the valve seats, annular packings surrounding the valve seats supported in the front and back portions of the casing, means for pressing said packings into intimate contact with the corresponding faces of the disk to effect an equalizing pressure thereon and provide a balanced support for the disk, a rotatable shaft extending through the front and back portions of the casing for carrying the disk and having a forwardly extending end, and an operating handle carried by said forward extension.

4. A valve comprising a casing including opposed spaced plates, aligned inlet and outlet nipples extending through the plates having their inner ends spaced, a rotatable ported valve movable between the plates and nipples whereby to dispose the port in registration with said nipples or to one side thereof, packing rings slidable on the nipples and disposed upon opposite sides of the valve, resilient elements urging the packing rings into contacting engagement with the valve, and means at each side of the casing whereby to adjust the tension of the springs to compensate for wear of the packing rings and balance the valve.

In witness whereof, I have hereunto subscribed my name this 20th day of March, 1924.

ADOLPH HERRMANN.